United States Patent [19]

Sugisawa et al.

[11] Patent Number: 4,871,565

[45] Date of Patent: Oct. 3, 1989

[54] METHOD OF PRODUCING RETORT PACKAGED FISH

[75] Inventors: Ko Sugisawa; Yasushi Matsumura, both of Nara; Hidefumi Okamoto, Sakai; Kumiko Abe, Kurashiki, all of Japan

[73] Assignee: House Food Industrial Company Limited, Osaka, Japan

[21] Appl. No.: 91,870

[22] Filed: Sep. 1, 1987

[30] Foreign Application Priority Data

Sep. 11, 1986 [JP] Japan .............................. 61-214789

[51] Int. Cl.[4] ...................... B65D 81/34; B65B 55/04; A23L 3/00; A23B 4/00

[52] U.S. Cl. .................................... 426/407; 426/412; 426/643; 426/509; 426/510

[58] Field of Search ............... 426/129, 412, 643, 402, 426/400, 401, 407, 325, 324, 332, 417

[56] References Cited

U.S. PATENT DOCUMENTS

| | | | |
|---|---|---|---|
| 2,055,230 | 9/1936 | David et al. | 426/417 |
| 2,058,849 | 10/1936 | Bergen | 426/417 |
| 2,088,831 | 8/1937 | Ash et al. | 426/643 |
| 2,131,902 | 10/1938 | Peebles et al. | 426/402 |
| 2,605,184 | 5/1952 | Osbourne | 426/417 |
| 2,635,050 | 4/1953 | Stevenson et al. | 426/643 |
| 3,137,581 | 6/1964 | Toft | 426/417 |
| 3,552,982 | 1/1971 | Savidge | 426/412 |
| 3,912,823 | 10/1975 | Kane | 426/129 |
| 4,419,370 | 12/1983 | Yamamoto | 426/643 |
| 4,606,922 | 8/1986 | Schirmer | 426/129 |

FOREIGN PATENT DOCUMENTS

| | | | |
|---|---|---|---|
| 58-98058 | 6/1983 | Japan | 426/129 |
| 59-106253 | 6/1984 | Japan | 426/129 |
| 59-151864 | 8/1984 | Japan | 426/129 |
| 59-166061 | 9/1984 | Japan | 426/643 |
| 59-198957 | 11/1984 | Japan | 426/643 |
| 61-247365 | 11/1986 | Japan | 426/407 |
| 61-260831 | 11/1986 | Japan | 426/129 |
| 1382290 | 1/1975 | United Kingdom | 426/643 |
| 1385556 | 2/1975 | United Kingdom | 426/643 |

*Primary Examiner*—Steven Weinstein

*Attorney, Agent, or Firm*—Oblon, Spivak, McClelland, Maier & Neustadt

[57] ABSTRACT

A method of producing retort food comprises the steps of subjecting broiled fish to hot-water processing in hot water at a temperature of 65° to 98° C. for 10 to 150 seconds; enclosing the resulting broiled fish in a packaging container in a sealing manner; and subjecting the broiled fish to retort sterilization processing. According to the method, there is provided a retort food comprising broiled fish capable of minimizing the generation of drips from broiled fish at the time of retort sterilization processing and maintaining a good appearance.

7 Claims, No Drawings

METHOD OF PRODUCING RETORT PACKAGED FISH

CROSS-REFERENCE OF THE RELATED APPLICATION

This application is related to the application Ser. Nos. 030,348, filed on Mar. 26, 1987, now U.S. Pat. No. 4,798,728; and 035,190, filed on Apr. 7, 1987, now U.S. Pat. No. 4,840,805 which have been assigned to the assignee of this application.

BACKGROUND OF THE INVENTION

1. Field of the Invention

This invention relates to a method of producing retort food comprising broiled fish and, more particularly, to a method of producing retort food which effectively limits the generation of drips from broiled fish at the time of retort sterilization processing.

2. Prior Art

So far, retort food consisting of "broiled fish" has been proposed. For example, Japanese Patent Publication No. 54-37214 discloses that a cut eel is broiled and then dried until the surface of the eel hardens in order to be vaccum-packaged, and Japanese Patent Publication No. 57-33010 discloses that a meat or fish is charged in a bag and thereafter the air in the bag is replaced by a carbon dioxide gas or a mixture of carbon dioxide and gas to subject it to sterilization processing. Furthermore, Japanese Patent Unexamined Publication (KOKAI) No. 59-166061 discloses that a dried fish is immersed in a seasoning solution, broiled an vacumm-packaged, and Japanese Patent Unexamined Publication No. 55-150879 also discloses that a flatfish is immersed in a seasoning solution, slightly dried, and vaccum-packaged to subject it to high pressure (1.5–2 atoms-)—heat (110°–120° C.) treatment.

However, if broiled fish is enclosed in a packing container in a sealing manner and undergoes retort sterilization processing, water separation occurs in the broiled fish during retort sterilization so that juice (referred to as "drips" hereinafter) is released in the broiled fish. These drips are held between the fish body and the inside surface of a container, resulting in great deterioration of the dry texture and taste which are required of broiled fish. In particular, the drips flow out and the oils present in the drips adhere to and solidify on the surface of the fish during cooling, resulting in great deterioration of the appearance, if the container is transparent.

SUMMARY OF THE INVENTION

It is therefore a primary object of the present invention to provide a retort food comprising broiled fish capable of minimizing the generation of drips from broiled fish at the time of retort sterilization processing and maintaining a good appearance.

This and other objects of the present invention will be clear from the following description.

The present invention has been accomplished on the basis of the finding that it is possible to effectively solve the above-described problems by subjecting broiled fish to hot-water processing before enclosing it in a packaging container with sealing.

In accordance with the present invention, there is provided a method of producing retort food in which broiled fish is subjected to hot-water processing, thereafter enclosed in a packing container with sealing, and subjected to retort sterilization processing.

DESCRIPTION OF THE PREFERRED EMBODIMENTS

Any kind of fish may be used to provide broiled fish in accordance with the present invention, and examples of such fish are sardine, horse mackerel, pacific saury, mackerel, salmon, yellowtail, spanish mackerel, herring, eel, conger eel, flatfish, sea bream, and pollack. Any means may be employed for baking the fish material, for example, direct heating by flame or heating by infrared rays may be employed. Preferably, the fish may be heated by direct heating with a flame of medium or low strength so that the fish meat has hardness of 85 g to 1500 g, more preferably, 105 g to 1250 g. This ensures that the fish meat can be prevented from being broken when the broiled fish undergoes hot-water processing. Moreover, it is possible to minimize the amount of drips flowing from the fish at the time of retort sterilization by packing broiled fish having the above specific hardness in a retort container in a sealing manner. It is also possible to prevent to the maximum extent breakage of the fish and separation of the skin during retort sterilization and transportation.

The hardness of the broiled fish is determined by the measuring method described below. The fish meat of the broiled fish which has been baked and then cooled at room temperature is cut into 1 $cm^3$ cubes to form samples, and a force is applied to each sample perpendicular to the muscle fiber of the fish meat thereof to allow the hardness of the broiled fish to be measured by using a rheometer (produced by Fudo Kogyo Co., Ltd.). In this regard, the measurement conditions are a plunger diameter of 30 mm, a lifting speed of 6 cm/min, and a clearance of 5 mm. It has been found that the hardness of the broiled fish usually becomes between 40 g and 1500 g after the broiled fish having the above given hardness has been packaged in the retort container under vacuum and subjected to retort sterilization.

In accordance with the present invention, it is preferable to bake fish in such a manner that the yield of the broiled fish becomes 65 to 90% or, preferably, 75 to 85% after the fish has been baked.

The broiled fish used in accordance with the present invention may have any form such as a complete fish (including a fish body having no gut) or slices obtained by cutting a fish in a suitable manner (half body or a fish opened into two pieces). In the case of slices, it is preferable to cut the raw fish into slices and then bake it in order to prevent the flow of drips during retort sterilization.

The present invention is characterized by the step of subjecting the broiled fish to hot-water processing. The hotwater processing in accordance with the present invention may be based on a method of soaking the broiled fish in hot-water (blanching) or a method of blowing steam onto the broiled fish. It is preferable to perform the hot-water processing when the temperature of the broiled fish is in the range of 50° to 95° C. It is thereby possible for a drying processing in a following stage to effectively remove water which has become attached to the broiled fish.

It is preferable to blanch the broiled fish by soaking it in hot water having a temperature of 65° to 98° C. or, more preferably, 80° to 98° C. for 10 to 150 seconds or, more preferably, 10 to 60 seconds.

If the temperature of the hot water is lower than 65° C., it is not possible to adequately remove oil from the surface of the fish body even by soaking it for longer than 150 seconds and, hence, it is not possible to adequately limit the generation of drips from the fish body at the time of retort sterilization. If a drying processing is performed after blanching, this leaving and cooling processing cannot be performed effectively. If the temperature of the hot water is above 98° C., the skin of the fish body tends to separate and the fish meat tends to be easily broken after the fish has been soaked for only less than 10 seconds.

On the other hand, it is preferable to perform the steaming in such a manner that steam is blown to the broiled fish for 3 to 240 seconds or, more preferably, 10 to 120 seconds. The apparatus used to effect the steaming may be a batch type or a continuous type of smothering apparatus.

If the time during which steam is blown is shorter than 3 seconds, it is not possible to adequately remove oil from the surface of the fish body and, hence, it is not possible to adequately limit the generation of drips from the fish body at the time of retort sterilization. If the steam-blowing time exceeds 240 seconds, the skin of the fish body tends to separate and the fish meat tends to be easily broken.

The above-described hot-water processing may be performed by using water or steam. In this processing, water or steam may contain a polymer phosphate or the like whereby the fish is prevented from being browned at the time of retort sterilization.

In the method of producing retort food in accordance with the present invention, a drying processing may preferably be performed after the hot-water processing in such a manner that the broiled fish is dried by being left and cooled or subjected to hot-air blowing at a temperature of 25° to 75° C. for 30 seconds to 60 minutes so as to remove water which has been attached to the broiled fish by the hot-water processing.

In accordance with the present invention, the broiled fish which has undergone the above-described process is enclosed in a retort packaging container in a sealing manner. The container used here may be a pouch, a dish-like container having a film cover for covering its upward-facing opening, a dish-like container on which meat is placed and which is accommodated in a pouch, or a can-type container. The container may be made of any material which is waterproof and can withstand heat during the retort sterilization. Such material may be mainly constituted by one of the following raw materials: for example, nylon, polyester, polyethylene, polypropylene, polyvinyl chloride and aluminum foil.

Preferably, the sealing package may be made by vacuum packaging. In the vacuum packaging, it is specifically preferable to limit the air content to at most 35%. However, instead of using this technique, it is possible to fill the package with a non-oxidizing gas and thereafter seal the package.

The sealed container is then subjected to retort sterilization processing by an ordinary method, for example, a hot-water retorting or a steam retorting. The retort sterilization processing is performed, for example, at a pressure of 0.8 to 1.7 kg/cm$^2$ (gauge pressure), preferably 1 to 1.5 kg/cm$^2$ (gauge pressure), at a temperature of 115° to 130° C., preferably 121° to 127° C., for 5 to 60 minutes. If the sterilization is effected under these conditions, it is possible to limit the generation of drips from the fish body more effectively while suitably sterilizing the broiled fish.

The present invention thus provides a retort food which is free from any substantial generation of drips from broiled fish at the time of retort sterilization and which ensures a good appearance of the broiled fish in the package.

This retort food can be heated, for example, in hot water or in a microwave oven, whereby it is possible to serve broiled fish which has scorched parts and which is similar to that served immediately after being broiled.

The present invention will be described below by way of non-limitative examples.

EXAMPLE 1

Whole pacific saury (ventral-opened fish body) was baked by direct heating with a flame of medium or low strength until it was slightly scorched, thereby providing broiled fish of a yield of 80%. The broiled pacific saury (at a temperature of 80° C.) was soaked in hot water at 95° C. for about 15 seconds and was thereafter cooled by being left at a room temperature for about 30 minutes. The pacific saury thereby cooled was packaged under vacuum in a pouch made of SM nylon measuring 175 mm by 130 mm and was then subjected to retort sterilization processing in the manner of steam retorting under a pressure of 1.5 kg/cm$^2$ at a temperature of 121° C. for 24 minutes, thereby being completed as a product.

In accordance with the above producing method, the generation of drips from the fish body was effectively limited at the time of retort sterilization. The retort food obtained by this method had a good appearance and when it was prepared for serving by heating in a microwave oven after it had been preserved at a room temperature for 6 months, it exhibited the specific dry texture and taste of broiled fish.

EXAMPLE 2

Whole pacific saury (ventral-opened fish body) was baked by direct heating with a flame of medium or low strength until it was slightly scorched, thereby providing broiled fish of a yield of 80%. The broiled pacific saury (at a temperature of 80° C.) was accommodated in a batch type of smothering apparatus. Steam was blown onto the fish in the batch type smothering apparatus for about 30 seconds, and then the fish was cooled by being left at a room temperature for about 30 minutes. The pacific saury thereby cooled was packaged under vacuum in a pouch made of SM nylon measuring 175 mm by 130 mm and was subjected to retort sterilization processing in the manner of steam retorting under a pressure of 1.5 kg./cm$^2$ at a temperature of 121° C. for 24 minutes, thereby being completed as a product.

In accordance with the above producing method, the generation of drips from the fish body was effectively limited at the time of retort sterilization. A retort food obtained by this method had a good appearance and when it was prepared for serving heating in a microwave oven even after it had been preserved at a room temperature for 6 months, it exhibited the specific dry texture and taste of specific dryness of broiled fish.

What is claimed is:

1. A method of producing packaged fish which is substantially free of drips during retort sterilization, which consists essentially of:

(a) subjecting broiled fish to hot-water processing by either soaking said broiled fish in hot water having a temperature of 65° to 98° C. for 10 to 150 seconds, or blowing steam onto said broiled fish for 3 to 240 seconds;

(b) drying said hot-water processed broiled fish;

(c) enclosing said dried, hot-water processed, broiled fish in a sealed package; and (c) retort sterilizing said sealed package containing said dried, hot-water processed, broiled fish, wherein said packaged fish is selected from the group consisting of sardine, horse mackerel, pacific saury, mackerel, salmon, yellow tail, spanish mackerel, herring, eel conger eel, flat fish, sea bream and pollack, said broiled fish having a hardness of 85 g to 1500 g before said hot-water processing.

2. The method according to claim 1, wherein said drying is performed at 25° to 75° C. for 30 seconds to 60 minutes.

3. The method according to claim 1, wherein said broiled fish is vacuum packaged in said enclosing step.

4. The method according to claim 1, wherein the broiled fish is subjected to the hot-water processing when the temperature of the broiled fish is in the range of 50° to 95° C.

5. The method according to claim 1, which further comprises broiling said fish prior to said hot-water processing such that a yield of said broiled fish is 65 to 90%.

6. The method according to claim 1, wherein said broiled fish is soaked in hot water having a temperature of 80° to 98° C. for 10 to 60 seconds.

7. The method according to claim 1, wherein said broiled fish is enclosed in a transparent packaging container by vacuum packaging such that the container has an air content of at most 35%, or by filling said container with a non-oxidizing gas.

* * * * *